Oct. 19, 1948.   G. MAURER   2,451,759
SWAGING APPARATUS
Filed March 1, 1944                                4 Sheets-Sheet 1
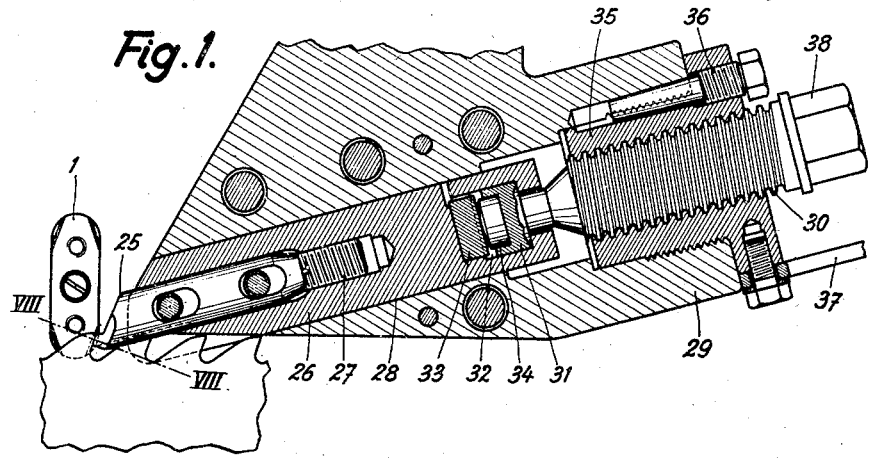
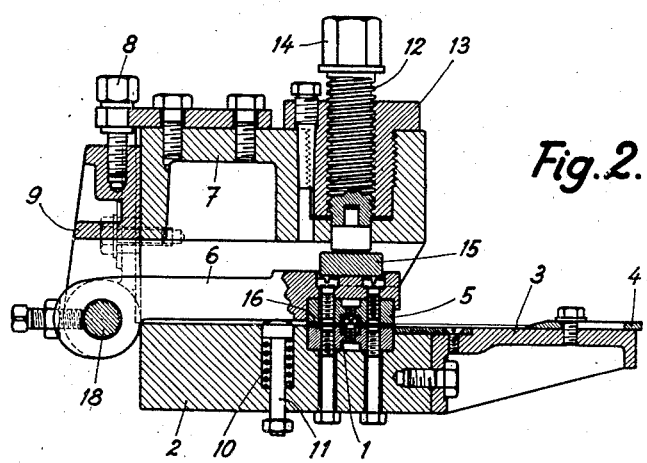
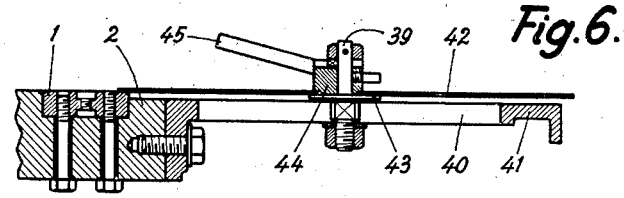
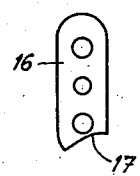
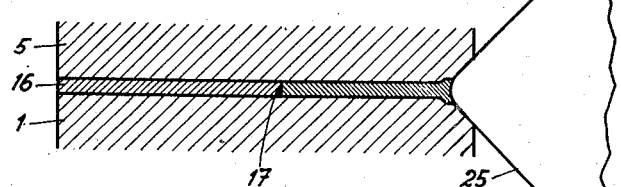
Inventor
G. Maurer
By Blair & Downing & Dubrul Attys Oct. 19, 1948.                G. MAURER                2,451,759
                           SWAGING APPARATUS
Filed March 1, 1944                              4 Sheets-Sheet 2
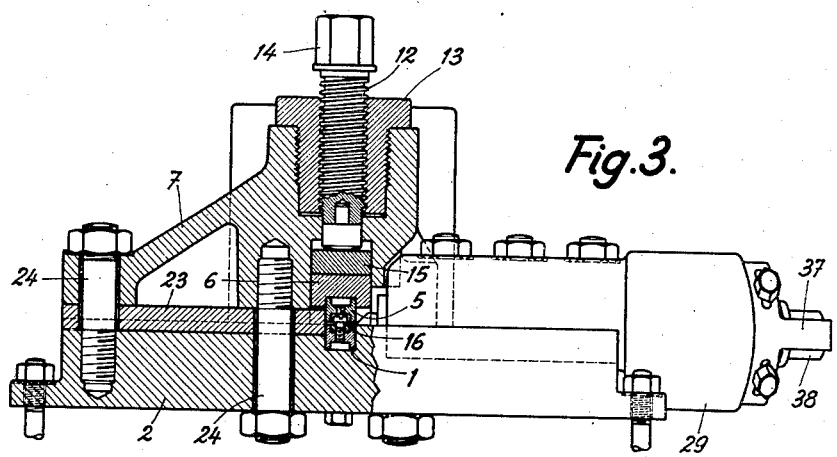
Fig.3.
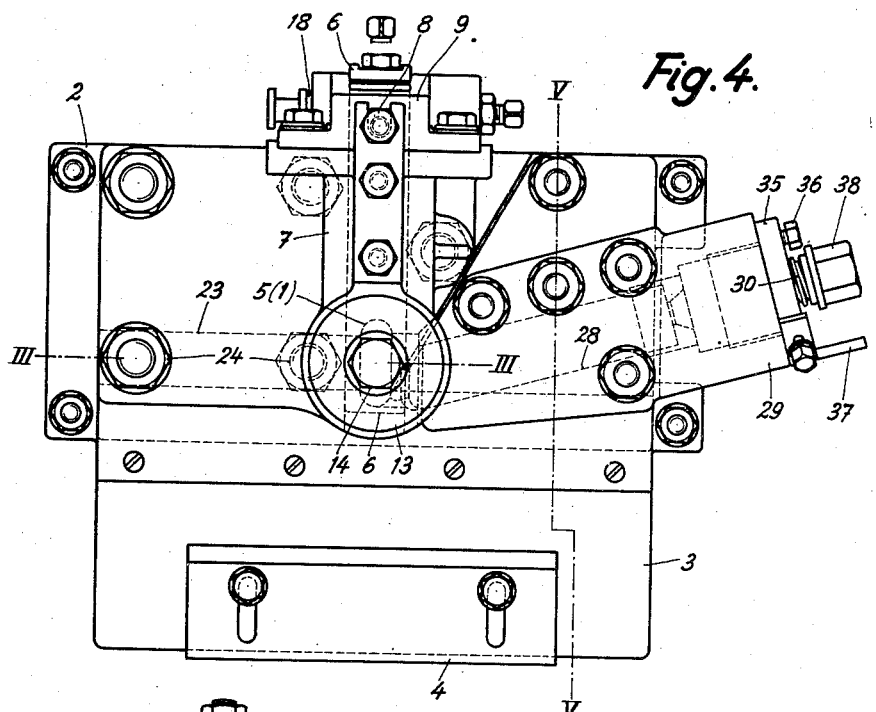
Fig.4.
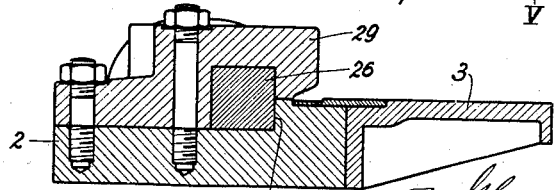
Fig.5.  Inventor
        G. Maurer
        By Glascock Downing Tulsa
                    Attys.

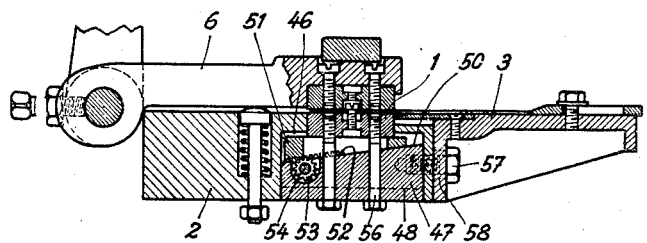
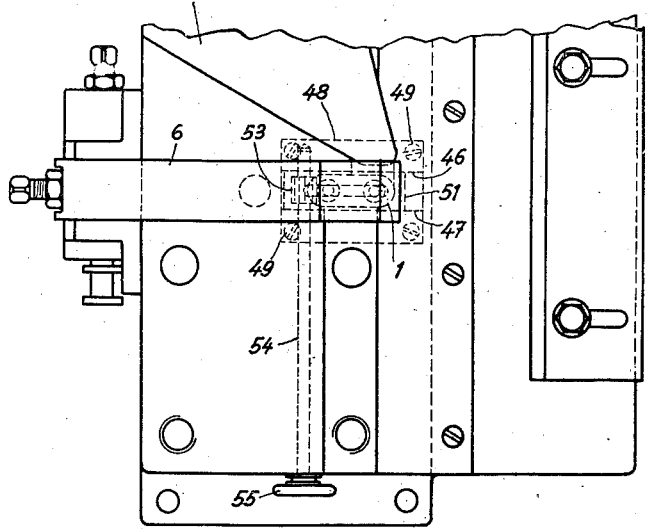
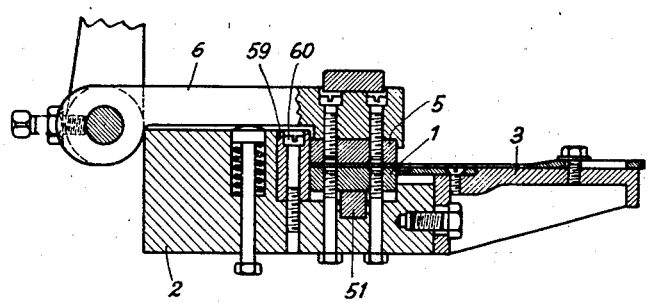
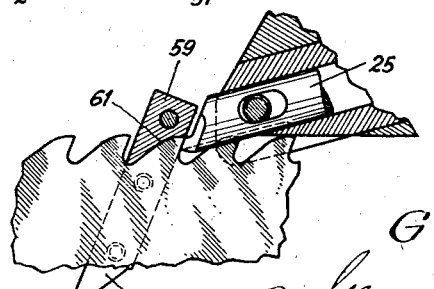

Patented Oct. 19, 1948

2,451,759

UNITED STATES PATENT OFFICE 2,451,759

SWAGING APPARATUS

Gottfried Maurer, Zurich, Switzerland, assignor to A. Müller A.-G. Brugg, Brugg, Switzerland, a joint-stock company of Switzerland Application March 1, 1944, Serial No. 524,607 In Switzerland January 19, 1943

Section 1, Public Law 690, August 8, 1946 Patent expires January 19, 1963

10 Claims. (Cl. 76—72)

Object of the present invention is a swaging apparatus for swaging the teeth of saw blades by means of a stamp.

In known swaging apparatus, where the teeth are insufficiently held during the swaging process, they are widened-out in some way by a stamp or an eccentric shaft. The teeth obtained in this manner are unequal even if the greatest care be taken on swaging. This inequality must be removed by a subsequent and troublesome equalising operation.

The swaging apparatus according to the invention has a die which, in the swaging process, determines the swaged form of the teeth. The tooth to be treated is thus held on all sides except the one on which the stamp must operate. Now, all teeth treated, independent of the form chosen, are completely equal among themselves. Their form is no longer dependent on fortuities such as differences in the hardness of the material, etc.

By preference, the die is made in sections and the saw blade clamped fast for each swaging process between the die sections.

The accompanying drawings illustrate, by way of example, one embodiment of the object of the invention, in which Fig. 1 is a longitudinal section through the stamp bearer and its drive of a first example, and a plan view of the stamp and of the die.

Fig. 2 is a section through the die and its clamping device, perpendicular to the fence for the saw blade to be treated.

Fig. 3 is a section along the line III—III in Fig. 4,

Fig. 4 is a plan view of the first embodiment,

Fig. 5 is a section along the line V—V in Fig. 4,

Fig. 6 is a section through a modified detail,

Fig. 7 shows an intermediate layer for the die,

Fig. 8 is a section along the line VIII—VIII in Fig. 1, on an enlarged scale,

Figure 13:
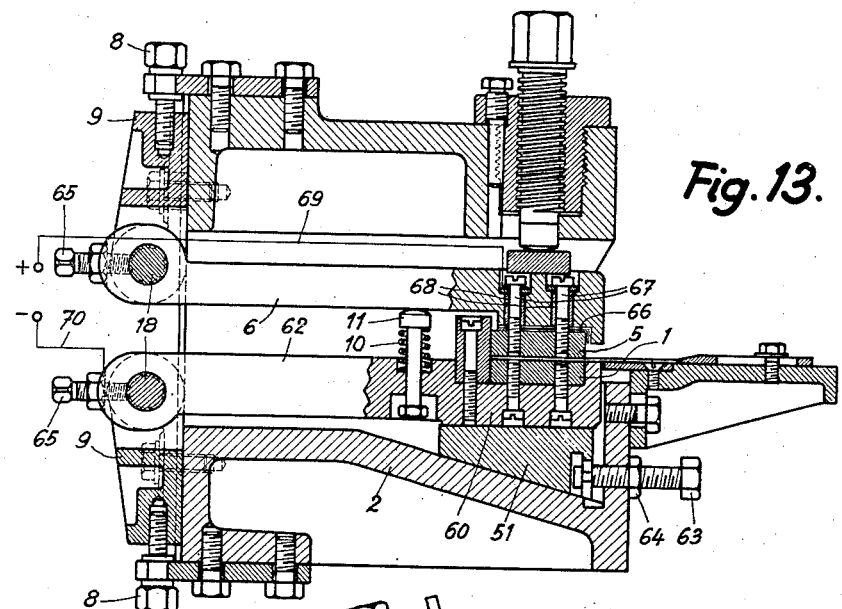
Figure 14:
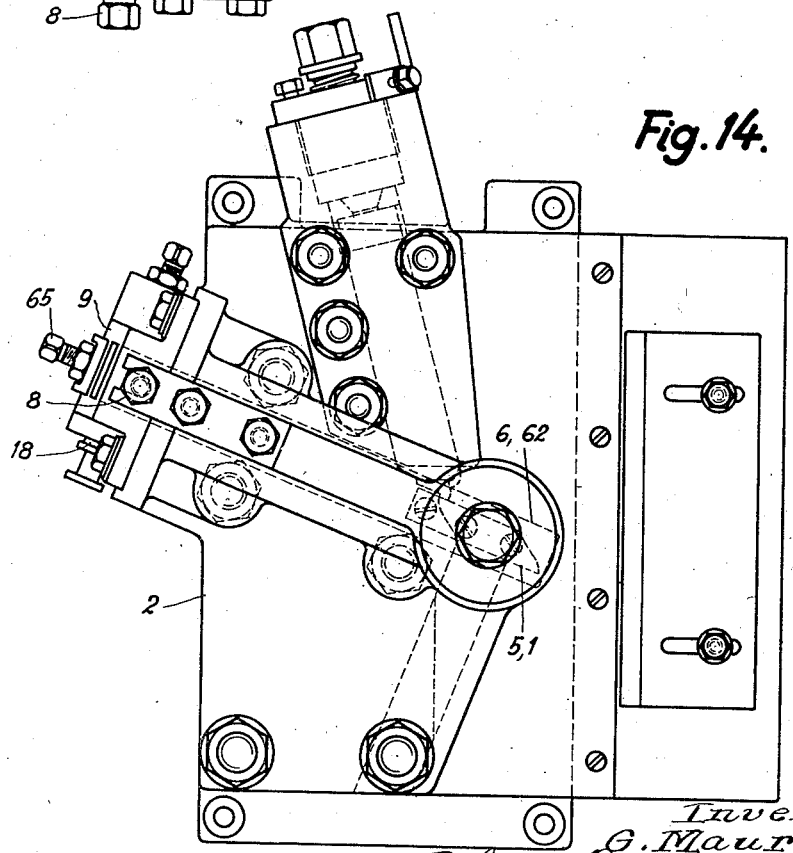

Fig. 9 is a section corresponding to that of Fig. 2, but of a second embodiment, Fig. 10 is a plan view of Fig. 9, Fig. 11 is a section corresponding to that of Fig. 2, but with an abutment block in place of an intermediate layer, Fig. 12 is a view corresponding to that of Fig. 1, but with the die running in the direction of the tooth face, Fig. 13 is a view corresponding to that of Fig. 2, wherein also the bottom die portion is mounted on a lever, Fig. 14 is a plan view to Fig. 13.

As may be seen from Fig. 1, the bottom die portion 1 is inserted into the plate 2 and screwed to the same To this plate 2 also the support 3 for the saw blade is fixed, this support carrying the adjustable fence 4 for the blade. The movable die portion 5 by means of which a clamping effect can be exerted on the saw blade, is screwed fast to a lever 6 rotatably mounted on the slide 9 by means of the bolt 18; the slide 9 being displaceable with regard to the upper part 7 by means of the screw 8. Bolt 11, under the influence of spring 10, tends to rotate lever 6 in the anticlockwise direction in order to lift the top die portion 5 off from the bottom die portion 1. A threaded spindle 12 is in engagement with the screwed bushing 13 of the upper part 7. This spindle 12, whose hexagonal head can receive a spanner for rotating it, is in contact with a stone 15 placed upon lever 6. By rotating spindle 12 in the one or the other direction either die portion 5 can be pressed against portion 1 and the saw blade thereby be clamped fast or the bolt 11 can be allowed to lift the die portion 5.

As is shown in Fig. 8, the die portions 1 and 5 between which the teeth of the saw blades are brought for swaging have on at least one of their corners the negative form of the flanks of the finished teeth. Between both die portions an intermediate layer 16 is inserted, the one edge 17 of the same having exactly the form of the back of the saw teeth. This intermediate layer is only so much thinner than the saw blade, that a good clamping effect of the two die portions 1 and 5 upon the blade is guaranteed. The die portions 1 and 5 can be provided with the negative tooth form on all the eight corners. For changing this form it is only necessary either to rotate the die in a horizontal plane or to interchange at the same time the upper and the lower die portions. Either all corners may be provided with like flank forms in order that a worn-out pair can be replaced by a new one or eight different tooth profiles may be provided on the same die.

The mutual distance of the two die portions 1 and 5 must be adaptable to the thickness of different saw blades. This adaptation is carried out with the help of the screw 8 by displacing the axis of rotation of lever 6.

In order that the die portions 1 and 5 cannot give way under the pressure of the stamp acting from right to left in Fig. 3, a plate 23 of hardened steel or other sufficiently hard material is inserted between the plate 2 and the upper part 7 and secured against any displacement whatever by clamping it fast with the help of the screws 24.

The stamp 25 swaging the tooth clamped fast in the die is inserted into the stamp bearer 26. The screw bolt 27 serves to adjust the correct axial position of the stamp 25 with regard to the tooth to be treated. The bearer 26 is displaceably held in a guide 28 formed by the plate 2 and the member 29 screwed to the latter (Fig. 5). The bearer 26 is detachably connected with the threaded spindle 30 in the following manner: At the one end this spindle 30 carries a head 31 which is laterally introduced into a hollow 32 of the bearer 26 from which the head 31 can also be removed laterally. Bearer 26 and head 31 carry stones 33, 34, for instance of hardened steel, through which the force is transmitted from the spindle 30 to the bearer 26 and the stamp 25. The threaded spindle 30 engages the corresponding threads of the bushing 35 screwed to the part 29. This bushing 35 is secured by the screws 36 and carries the stop 37 limiting the way of a lever engaging the hexagonal head 38 for rotating the spindle 30, the stop 37 thereby limiting the advance of the stamp 25. If the stamp is to be exchanged, the bushing 35 is unscrewed, the whole taken out, the bearer 26 loosened from the spindle 30, a new bearer with a new stamp fixed to the spindle 30 and then the whole again introduced into the guide 28.

Supposing, for instance, that a band saw blade is to be swaged. The die is opened and the first tooth of the blade is introduced between the upper and lower die portion 5, 1 respectively until the back of the tooth strikes against the edge 17 of the intermediate layer 16 and the edge of the blade lying opposite the teeth makes contact with the fence 4. Now the spindle 12 is rotated and the blade clamped fast in the die. Then the spindle 30 is rotated until the turning lever strikes against the stop 37. On this occasion the stamp 25 penetrates into the face of the tooth and swages the tooth material so that it applies at all points exactly to the flank surfaces of the die. Hereupon, the spindle 30 is returned and the stamp thereby moved backwards. Now the spindle 12 is rotated in the opposite direction, the tooth removed from the die, the next one introduced into the latter so that the above cycle can again begin. Owing to this swaging in a die which has the form of the teeth and in which the same are held from all sides, these teeth when treated all become exactly equal.

The above described swaging apparatus can also be used for circular saw blades if the support 3 and the fence 4 are replaced by the device according to Fig. 6. The pin 39 is displaceable in the direction towards and away from the die along a slot 40 of the support 41 screwed to the plate 2. The circular saw blade 42 to be treated is placed upon the disc 43 and an eccentric 44 with a handle 45 is brought into the centre bore of the saw blade 42. In Fig. 6 a tooth is inserted into the die. If the same is to be with-drawn, the lever 45 is rotated so that the eccentric 44 displaces the saw blade 42 to the right. For inserting the next tooth into the die the lever 45 is turned in such a way that the eccentric 44 again comes into the position shown in Fig. 6.

It is understood that by the above swaging any form desired may be given to the tooth flanks. Also the swaged tooth face may take any shape required by forming the stamp correspondingly, e. g. by giving it an arc-like shape or a groove, a notch or a plane surface.

From the above it will easily be seen that with the described swaging apparatus all the teeth of a blade become equal, subsequent equalising of the flanks is thus reduced or even avoided.

If the thickness of a saw blade is different from that of the previously treated blade, the bottom die portion 1 in the above-described example must be changed, otherwise the axis of the stamp 25 would no longer fall into the median plane of the saw blades. Figs. 9 and 10 illustrate a construction in which a changing of the die portion 1 is avoided. In a hollow 46 of the plate 2 a block 47 is provided, whose flanges 48 are fastened to the plate 2 by means of the screws 49. On the upper inclined surface 50 of the block 47 a wedge 51 is supported, which carries the bottom die portion 1. The lower edge of the wedge 51 is formed as a toothing 52 engaging a pinion 53 whose shaft 54 leads towards the outside, where it carries a hand wheel 55. If the position of the bottom die portion 1 is to be adjusted, the bolts 56 are loosened and the hand wheel 55 rotated. Thereby, the wedge 51 is, as seen in Fig. 9, moved to the left or to the right according to the direction of rotation of the hand wheel, so that the die portion 1 is lowered or lifted. By this manipulation the axis of the stamp 25 is brought into the median plane of the saw blade to be treated. The screws 57 for fastening the support 3 go through the slots 58 so that, if necessary, also the position of this support 3 can be adapted to the new saw blade thickness.

If the thickness changes from one blade to another, the intermediate layer 16 must also be changed, as may easily be seen from Fig. 8. In order to avoid this, a back block 59 as shown in Figs. 11 and 12 can be provided, which is fixed to the plate 2 by means of the screw 60 and which includes a surface 61 having the form of the tooth back and engaging the die portions 1 and 5. If, for adjusting a new saw blade thickness, the die portions 1 and 5 are vertically displaced, they slide along the back block 59, this latter, therefore, replacing an intermediate layer for any blade thickness.

The back block may, of course, also be used in an embodiment where the bottom die portion must be changed.

In Fig. 12, the die consisting of the portions 1 and 5 is, with regard to that shown in Fig. 1 turned into a position parallel to the tooth face. This has the following advantage: If in the die according to Fig. 1 where the negatives of the tooth flanks are provided on the corners, the two die portions are somewhat displaced with regard to one another in axial direction, the teeth become unsymmetrical with regard to the median plane of the saw blade. This is avoided by the disposition according to Fig. 12. Here the negatives of the tooth flanks are on the longitudinal edges of the die portions and a mutual displacement of the latter in axial direction has no influence whatever upon the tooth form. In this case, lever 6, as may be seen from Fig. 14 described later on, must be placed with its longitudinal axis in the direction of the longitudinal axis of the die.

In order to facilitate the mounting of the bottom die portion 1, also this bottom die portion 1 is fixed to a lever 62 as is shown in Fig. 13. The bolt 18 of this lever 62 is mounted on a slide 9 which can be adjusted with regard to the plate 2 by means of a screw 8. Furthermore the free end of lever 62, containing the die portion 1, for adapting the position of this portion 1 to the saw blade thickness, is supported on a wedge 51, on which the adjusting screw 63 engaging a thread of the plate 2 is rotatably mounted. This screw 63, after displacement of the wedge 51, can be locked by means of the check nut 64. Bolt 11 being under the influence of spring 10, which, after the returning of the spindle 12, has to lift the lever 6, is provided on the lower lever 62. For changing the upper and the bottom die portion, the levers 6 and 62, after having loosened the screws 65, need only be drawn off from the bolts 18 and taken out.

In Fig. 14, the die 1, 5 is arranged in the same way as in Fig. 12 and the longitudinal axis of the levers 6 and 62 has the same direction as the longitudinal axis of the die portions 1 and 5.

In Fig. 13 it is also shown, how the die can be electrically heated. The upper die portion 5 is electrically insulated on all sides from the lever 6 on which it is mounted, for instance, by mica layers 66. Even the fastening screws 67 for the upper die portion 5 are electrically separated from the latter by the insulations 68. The one of these fastening screws serves simultaneously as terminal for the supply line 69 for the heating current. The negative pole is connected by means of the line 70 to the lower lever 62 leading to the mass. The current is led through a non-illustrated transformer. In this way the die is heated and the swaging of the teeth thus carried out under heat supply.

However, if the whole part of the saw blade, clamped fast between the die portions, is heated, one runs the risk that the thickness of the saw blade, owing to the clamping effect of the die portions, is diminished. In order to avoid this, the width of the die can be made so great that at least two teeth are simultaneously clamped fast between the die portions, which latter are electrically subdivided in such a manner, that only one tooth is heated while the other remains cold, thereby serving as a stop for the die portions in order to avoid diminishing of the thickness of the saw blade by the pressing effect of the die portions.

For securing the saw blade against any displacement caused by the stamp pressure, an adjustable non-illustrated stop can be brought into engagement with the back of any tooth of the saw blade.

Instead of a spindle, a hydraulic means might be used for driving the stamp.

What I claim is:

1. In a swaging apparatus for swaging saw teeth, a frame, a mould made in sections, one of said sections having the form of the back of the teeth to be swaged in order to serve as a resting support for said back, a lever mounted on said frame carrying one of said sections, lying with its face having the form of the side face of the teeth to be swaged in front of a similar face of another mould section, a driving means in cooperation with said lever for approaching the mould section on said lever to the opposite mould section for clamping fast a tooth between said two mould sections, and a stamp slidably mounted on said frame to carry out rectilinear movement and arranged to work upon the front face of a tooth clamped fast in said mould.

2. In a swaging apparatus for swaging saw teeth a frame, a mould made in sections, one of said sections having the form of the back of the teeth to be swaged in order to serve as a resting support for said back, a lever mounted on said frame with a movable fulcrum for the adjustment of its position to the thickness of the teeth to be swaged, said lever carrying one of said sections lying with its face having the form of the side face of the teeth to be swaged in front of a similar face of another mould section, a driving means in cooperation with said lever for approaching the mould section on said lever to the opposite mould section for clamping fast a tooth between said two mould sections, an elastic device in cooperation with said lever for automatically removing the opposite mould sections from each other on said lever being released by said driving means, and a stamp slidably mounted on said frame to carry out rectilinear movement and organised to be moved toward and away from the open side of said mould.

3. In a swaging apparatus for swaging saw teeth, a frame, a mould comprising two individual side sections and an individual back section cooperating with said side sections, the faces of said side sections lying in front of each other having the form of the side faces of the teeth to be swaged, said back section having a face of the form of the back of the teeth to be swaged in order to form a rest support for said back, a lever mounted on said frame carrying one of said side sections, a driving means in cooperation with said lever for approaching the side section on said lever to the other side section for clamping fast a tooth between said side sections, and a stamp for swaging the front face of the teeth, slidably mounted on said frame to carry out rectilinear movement and organised to be moved toward and away from the open side of said mould.

4. In a swaging apparatus according to claim 3, said back section being formed as an intermediate layer lying between said side sections.

5. In a swaging apparatus according to claim 3, said back section being formed as a block in contact with said side sections, one of said side sections being displaceable along said block for adapting the mutual position of said side sections to the thickness of the saw teeth to be swaged.

6. In a swaging apparatus for swaging saw teeth, a mould made in individual sections, one of said sections having the form of the back of the teeth to be swaged in order to serve as a resting abutment for said back, a lever carrying one of said sections, lying with its face having the form of the side face of the teeth to be swaged in front of a similar face of another mould section, a driving means in cooperation with said lever for approaching the mould section of said lever to the opposite mould section for clamping fast a tooth between said two mould sections, a support, a stamp bearer slidably and non-rotatably mounted on said support, a stamp fixed to said bearer, a threaded spindle fitted in said support and in detachable drive connection with said stamp bearer to advance said stamp to work upon the front face of the saw tooth clamped fast in said mould.

7. In a swaging apparatus for swaging saw teeth, a frame, a mould made in sections, one of said sections having the form of the back of the teeth to be swaged in order to serve as a resting support for said back, a lever mounted on said frame carrying one of said sections, lying with its face having the form of the side face of the teeth to be swaged in front of a similar face of another mould section, a driving means in cooperation with said lever for approaching the mould section on said lever to the opposite mould section for clamping fast a tooth between said two mould sections, and a stamp slidably mounted on said frame to carry out rectilinear movement and arranged to work upon the front face of a tooth clamped fast in said mould, said mould being disposed in such a way that its face plane lying in front of said stamp lies in the same direction as the edges of the front face of the teeth to be swaged.

8. In a swaging apparatus according to claim 3, said driving means comprising a threaded spindle in cooperation with said lever, an axle rotatably carrying said lever, adjustable in position for the purpose of adapting the side section carried by said lever to the thickness of the saw teeth to be swaged, and a wedge in cooperating relation to the other of said side sections for the purpose of adapting the position of said other side section to the thickness of the saw teeth to be swaged.

9. In a swaging apparatus according to claim 3, said driving means comprising a threaded spindle in cooperation with said lever, an axle rotatably carrying said lever, adjustable in position for the purpose of adapting the side section carried by said lever to the thickness of the saw teeth to be swaged, a wedge in cooperating relation to the other of said side sections for the purpose of adapting the position of said other side section to the thickness of the saw teeth to be swaged, said wedge having a toothed face, and a toothed wheel operable from the outside, engaging said toothed edge.

10. In a swaging apparatus according to claim 3, a first axle rotatably carrying said first lever, a second lever carrying the other of said side sections, a second axle rotatably carrying said second lever, said first and said second axle being adjustable in position for the purpose of adapting the mutual position of said side sections to the thickness of the saw teeth to be treated.

GOTTFRIED MAURER.

REFERENCES CITED

The following references are of record in the file of this patent:

UNITED STATES PATENTS

| Number | Name | Date |
|---|---|---|
| 134,666 | Henis | Jan. 7, 1873 |
| 297,559 | Vrudges | Apr. 29, 1884 |
| 309,533 | Emerson | Dec. 23, 1884 |
| 315,104 | Wolfe | Apr. 7, 1885 |
| 331,262 | Traverse | Nov. 24, 1885 |
| 333,540 | Parke | Jan. 5, 1886 |
| 376,128 | Williams | Jan. 10, 1888 |
| 508,118 | Pribnow | Nov. 7, 1893 |
| 559,230 | Thrall et al. | Apr. 28, 1896 |
| 639,472 | Walquist et al. | Dec. 19, 1899 |
| 919,153 | GeBott | Apr. 20, 1909 |
| 936,800 | McKam | Oct. 12, 1909 |
| 997,040 | Carroll | July 4, 1911 |
| 1,008,621 | Tappendorff | Nov. 14, 1911 |
| 1,492,093 | Barnhart | Apr. 29, 1924 |
| 1,448,602 | Smith | Mar. 13, 1923 |
| 1,680,256 | Pribnow | Aug. 7, 1928 |
| 1,684,950 | Dornseif | Sept. 18, 1928 |
| 1,824,349 | Horton et al. | Sept. 22, 1931 |
| 1,856,034 | Taylor | Apr. 26, 1932 |
| 1,909,268 | Gommel | May 16, 1933 |
| 2,137,225 | Bodenhamer | Nov. 22, 1938 |
| 2,336,726 | Ferguson | Dec. 14, 1943 |

FOREIGN PATENTS

| Number | Country | Date |
|---|---|---|
| 736,096 | France | Sept. 12, 1932 |
| 427,582 | Great Britain | Apr. 26, 1935 |